United States Patent Office 3,695,824
Patented Oct. 3, 1972

3,695,824
DYEING HUMAN HAIR WITH ISOXAZOLONE COUPLING COMPONENT
Rolf Rehberg, Brunnenstrasse 5, Heidesiedlung, 6231 Niederhofheim, Germany
No Drawing. Filed Apr. 20, 1970, Ser. No. 30,236
Int. Cl. A61k 7/12
U.S. Cl. 8—10.2                                                3 Claims

ABSTRACT OF THE DISCLOSURE

In an aqueous composition for dyeing human hair comprising an oxidation dyestuffs combination of a developer component and a coupling component and customary dyestuff adjuvants, the improvement which comprises utilizing as said oxidation dyestuffs combination, from 0.6% to 10% by weight of an oxidation dyestuffs combination of (a) a developer component compound, known for hair dyes, having the formula

wherein Ar represents an aromatic nucleus, X represents a member selected from the group consisting of hydrogen, amino, dialkylamino having from 1 to 2 carbon atoms in the alkyls, alkoxy having from 1 to 2 carbon atoms, alkyl having from 1 to 2 carbon atoms and hydroxyl and $n$ is an integer from 1 to 2, and (b) a coupling component compound having the formula

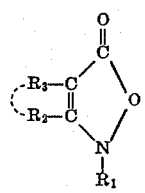

wherein $R_1$ is selected from the group consisting of hydrogen and an acid group capable of being hydrolytically cleaved, $R_2$ represents a hydrocarbonyl, $R_3$ represents a member selected from the group consisting of hydrogen and a hydrocarbonyl and $R_2$ and $R_3$ together represent the residue of a six membered ring, as well as the method of dyeing human hair utilizing said oxidation dyestuffs combination of a developer component and a coupling component.

THE PRIOR ART

The use of oxidation dyestuffs for dyeing human hair has been known for many years, aromatic m-diaminocompounds, m-aminophenols and dihydroxynaphthalenes being used as the coupling components. The said compounds are converted into dyestuffs on the hair by oxidation either with air, or, especially, by addition of chemical oxidizing agents such as hydrogen peroxide. Owing to their chemical constitution, however, these compounds have the disadvantage that the dyestuffs formed do not represent compounds which can be defined as homogeneous and when they have different periods of action, they may in some cases react further.

OBJECTS OF THE INVENTION

An object of the present invention is, in an aqueous composition for dyeing human hair comprising an oxidation dyestuffs combination of a developer component and a coupling component and customary dyestuff adjuvants, the improvement which comprises utilizing as said oxidation dyestuffs combination, from 0.6% to 10% by weight of an oxidation dyestuffs combination of (a) a developer component compound, known for hair dyes, having the formula $$(X)_n Ar—NH_2$$

wherein Ar represents an aromatic nucleus, X represents a member selected from the group consisting of hydrogen, amino, dialkylamino having from 1 to 2 carbon atoms in the alkyls, alkoxy having from 1 to 2 carbon atoms, alkyl having from 1 to 2 carbon atoms and hydroxyl and $n$ is an integer from 1 to 2, and (b) coupling component compound having the formula

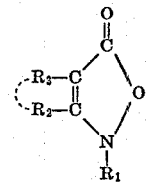

wherein $R_1$ is selected from the group consisting of hydrogen and an acid group capable of being hydrolytically cleaved, $R_2$ represents a hydrocarbonyl, $R_3$ represents a member selected from the group consisting of hydrogen and a hydrocarbonyl and $R_2$ and $R_3$ together represent the residue of a six membered ring.

Another object of the present invention is, in the process of dyeing human hair which comprises treating the hair at a temperature of from 10° to 40° C. with an aqueous composition for dyeing human hair comprising an oxidation dyestuffs combination of a developer component and a coupling component, and customary dyestuff adjuvants, in the presence of an oxidizing agent, which comprises utilizing as said oxidation dyestuffs combination, from 0.6% to 10% by weight of an oxidation dyestuffs combination of (a) a developer component compound, known for hair dyes, having the formula $$(X)_n—Ar—NH_2$$

wherein Ar represents an aromatic nucleus, X represents a member selected from the group consisting of hydrogen, amino, dialkylamino having from 1 to 2 carbon atoms in the alkyls, alkoxy having from 1 to 2 carbon atoms, alkyl having from 1 to 2 carbon atoms and hydroxyl and $n$ is an integer from 1 to 2, and (b) a coupling component compound having the formula

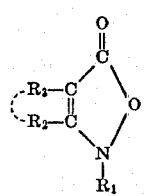

wherein $R_1$ is selected from the group consisting of hydrogen and an acid group capable of being hydrolytically cleaved, $R_2$ represents a hydrocarbonyl, $R_3$ represents a member selected from the group consisting of hydrogen and a hydrocarbonyl and $R_2$ and $R_3$ together represent the residue of a six membered ring.

These and other objects of the invention will become more apparent as the description thereof proceeds.

DESCRIPTION OF THE INVENTION

It has now been found that the drawbacks of the prior art can be largely avoided and the objects of the invention can be achieved if the process described below for dyeing human hair with solutions, emulsions or creams which contain the oxidation dyestuffs combination of the invention and the usual additives for hair dyes, is carried out.

The present invention therefore provides an oxidative dyestuffs combination for dyeing human hair comprising (a) a developer component compound, known for hair dyes, having the formula

wherein Ar represents an aromatic nucleus, X represents a member selected from the group consisting of hydrogen, amino, dialkylamino having from 1 to 2 carbon atoms in the alkyls, alkoxy having from 1 to 2 carbon atoms, alkyl having from 1 to 2 carbon atoms and hydroxyl and $n$ is an integer from 1 to 2, and (b) a coupling component compound having the formula

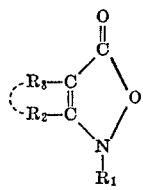

wherein $R_1$ is selected from the group consisting of hydrogen and an acid group capable of being hydrolytically cleaved, $R_2$ represents a hydrocarbonyl, $R_3$ represents a member selected from the group consisting of hydrogen and a hydrocarbonyl and $R_2$ and $R_3$ together represent the residue of a six membered ring.

In a further aspect, the present invention provides a process for dyeing human hair comprising treating the hair with a composition in the presence of an oxidizing agent at a temperature of from 10° to 40° C., containing the oxidation dyestuffs combination of the invention.

The coupling component of the oxidation dyestuffs combination of the invention is an isoxazolone of the general Formula I

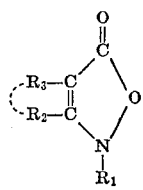

I in which $R_1$ represents a hydrogen atom or an acid group capable of being hydrolytically cleaved,
$R_2$ represents a hydrocarbon residue, and
$R_3$ represents a hydrogen atom or a hydrocarbon residue, which in some cases may form with $R_2$ a six-membered ring.

Acid groups ($R_1$) which can be split off hydrolytically are for example, the following: $C_2H_5CO-$, $CH_3CO-$, $C_6H_5CO-$, $C_6H_5NHCO-$, $CH_3OCO-$, $C_2H_5OCO-$, $C_6H_5SO_2-$.

The hydrocarbon residues $R_2$ and $R_3$ may be present in the form of an aliphatic, aromatic or cycloaliphatic residue, straight or branched, short chain alkyl residues or an aromatic residue being preferably used.

Preferably the acid group capable of being hydrolytically cleaved ($R_1$) is lower alkanoyl, such as propionyl and acetyl; benzoyl; lower alkylbenzoyl; lower alkylcarbamoyl; phenylcarbamoyl; carbo-lower alkoxy, such as carbmethoxy and carbethoxy; lower alkylsulfonyl; and phenylsulfonyl. Preferably $R_2$ is lower alkyl, phenyl, lower alkylphenyl, phenyl-lower-alkyl, cyclohexyl, naphthyl and cyclohexenyl. Preferably $R_3$ is hydrogen or $R_2$. $R_2$ and $R_3$ together preferably are tetramethylene, lower alkyl-tetramethylene, and the remainder of a benzene ring which may be substituted by lower alkyl, carboxyl, carbamido or sulfonyl. Isoxazolones have been found specially suitable which correspond to the following general Formulae II, III and IV.

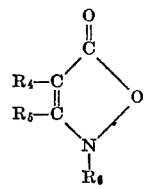

(II)

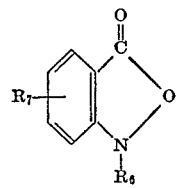

(III)

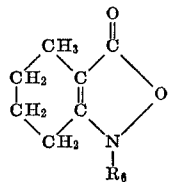

(IV)

In these formulae, $R_4$ represents hydrogen or alkyl with 1 to 4 carbon atoms or phenyl,
$R_5$ represents alkyl with 1 to 4 carbon atoms or phenyl,
$R_6$ represents a hydrogen atom or an acid group which can be cleaved hydrolytically, of the type already indicated in the case of $R_1$, and
$R_7$ represents hydrogen, alkyl with 1 to 4 carbon atoms, a carboxyl, a sulphonyl or a carbamoyl such as N-($\beta$-hydroxyethyl) carbamoyl.

Among the compounds under consideration, the following are to be particularly noted.

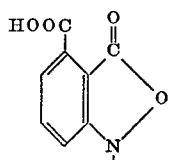

4-carboxy-$\beta$:$\gamma$-benzisoxazolone

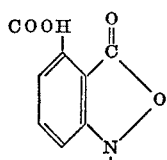

1-acetyl-4-carboxy-$\beta$:$\gamma$-benzisoxazolone

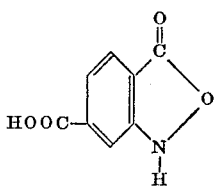

6-carboxy-$\beta$:$\gamma$-benzisoxazolone

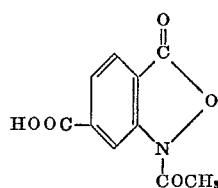

1-acetyl-6-carboxy-$\beta$:$\gamma$-benzisoxazolone

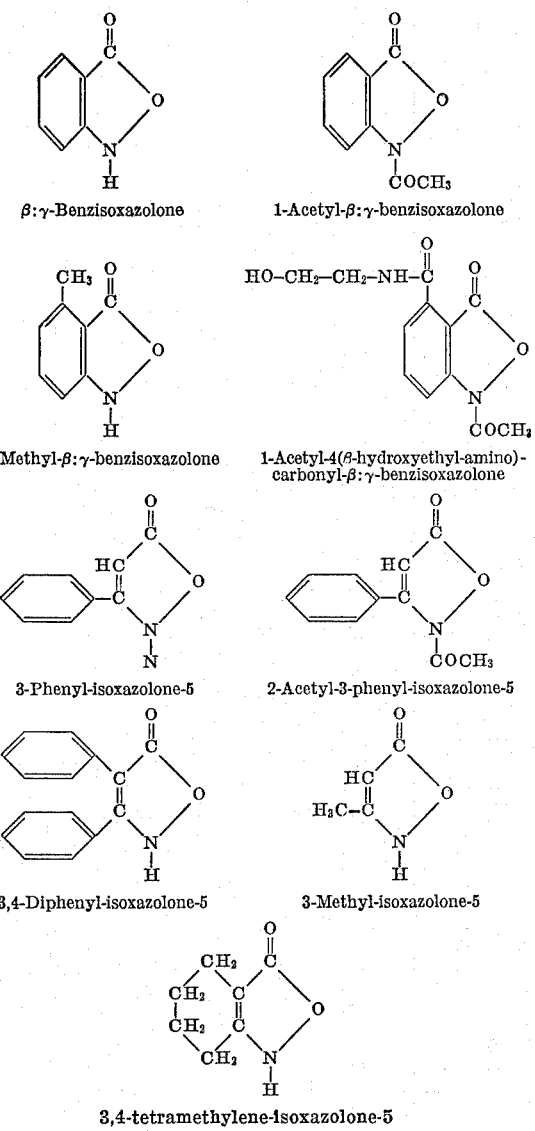

β:γ-Benzisoxazolone

1-Acetyl-β:γ-benzisoxazolone

4-Methyl-β:γ-benzisoxazolone

1-Acetyl-4-(β-hydroxyethyl-amino)-carbonyl-β:γ-benzisoxazolone

3-Phenyl-isoxazolone-5

2-Acetyl-3-phenyl-isoxazolone-5

3,4-Diphenyl-isoxazolone-5

3-Methyl-isoxazolone-5

3,4-tetramethylene-isoxazolone-5

The preparation of the isoxazolones is carried out by known processes. For example (benz)-isoxazolones can be prepared by reduction of ortho-nitrobenzoic acids or their esters, possibly substituted in the benzene nucleus. 3-phenylisoxazolones may be obtained by the reaction of benzoyl-acetic acid esters and hydroxy-ammonium chloride. The hydrogen atom attached to the nitrogen atom of the isoxazolones may easily be substituted by the groups $C_2H_5CO—$, $CH_3CO—$, $C_6H_5CO—$, $C_6H_5NHCO—$ $CH_3OCO—$, $C_2H_5OCO—$, $C_6H_5SO_2—$, by reaction with acid chlorides or isocyanates.

Substituted arylamines with at least one primary amino group are used as the developer component. Preferably these arylamines have the formula $(X)_n Ar—NH_2$ wherein Ar is an aromatic nucleus, such as phenylene, diphenylene, naphthylene, etc., X represents a member selected from the group consisting of hydrogen, amino, dialkylamino having from 1 to 2 carbon atoms in the alkyls, alkoxy having from 1 to 2 carbon atoms, alkyl having from 1 to 2 carbon atoms and hydroxyl and $n$ is an integer from 1 to 2. Suitable substituents are alkyl or alkoxy groups with 1 or 2 carbon atoms and preferably hydroxyl or amino groups. The following compounds may be specially mentioned: N - dimethyl - 1,4 - phenylenediamine, N - diethyl - 1,4 - phenylene - diamine, 2-methyl-4 - aminophenol, 2,5 - diaminoanisole, 2,5 - diaminotoluene, p - amino - diphenylamine and α - naphthylamine.

The coupling and developer components are suitably used in approximately molar amounts. However, it is not generally detrimental if the coupling components are present in a certain excess. Preferably the coupling component is present in a mol ratio of 0.8 to 1.3 for each mol of the developer component. Mixtures of the individual dyestuff components may also be used. The amounts of coupling components and developer components used in each case should be about 0.3 to 5% by weight, referred to the total composition.

As with other oxidation dyestuffs, the dye can be developed both by oxygen of the air and by chemical oxidizing agent, such as preferably hydrogen peroxide or its products of addition, especially with urea, melamine and sodium borate. The dyeing of the hair is effected at a temperature of from 10° to 40° C., preferably at room temperature. The dye treatment of the living human hair is preferably for a period of 10 minutes to 1 hour followed by a rinsing of the hair.

The hair dyeing compositions may be applied in the form of aqueous solutions, but especially in the form of creams or emulsions. For this purpose, the isoxazolone coupling components and the developing component compounds are mixed with any optional wetting agents or washing compositions, especially anionic or non-ionic substances. Suitable wetting and washing agents are especially alkylbenzenesulfonates, fatty alcohol sulfates, alkylsulfonates, fatty acid ethanolamides, products of addition of ethylene oxide to fatty acids and fatty alcohols, and fatty alcohol ether sulfates.

The absorptive capacity of the above-mentioned dyestuffs is also good when they are in admixture with such compositions. Consequently, the hair dyes can be produced in the form of shampoos, especially of cream shampoos, which are much desired in practice.

Further, thickeners such as, for example, methyl-cellulose, starch, higher fatty alcohols, vaseline (petrolatum), paraffin oil and fatty acids, and also perfume or hair conditioning substances such as, for example, pantothenic acid and cholesterol, may be admixed with the compositions of the invention.

The added substances are used in the amount customary for these purposes. Suitable added amounts of wetting agents are, especially, 0.5% to 30% by weight, and of thickeners, are 0.1% to 25% by weight, referred in each case to the total composition. The concentration of the dyestuff components (developer and coupling components) is to a certain extent dependent on the purpose of use.

The hair dyes are adjusted so that they are alkaline, preferably to a pH value of 8 to 10. The dyeings obtained with the hair dyes described above have good properties with respect to light, washing and rubbing.

The present invention will be further described by reference to the following specific examples. These, however, are not to be deemed limitative of the practice of the invention.

Example 1

2 parts by weight of 1-acetyl-4-carboxy-β:γ-benzisooxazolone and 1.1 part by weight of p-toluylenediamine were dissolved in an emulsion consisting of 1° parts by weight of fatty alcohol (carbon chain length $C_{16}$ to $C_{18}$), 10 parts by weight of sodium lauryl ether sulfate and 70 parts by weight of water. The product was adjusted to pH 9.5, 1 part by weight of hydrogen peroxide was added and the product was made up to 100 parts by weight with water. The cream dye so obtained dyed grey hair a dark brown at room temperature within 30 minutes.

Example 2

2 parts by weight of 4-carboxy-β:γ-benzisoxazolone and 1.45 parts by weight of N-dimethyl-p-phenylenediamine were incorporated in an emulsion as in Example 1, and the product was adjusted to pH 9.5, treated with 1 part by weight of hydrogen peroxide and made up to 100 parts by weight.

The cream dye so obtained dyed grey hair a brown-black at room temperature in the course of 30 minutes.

Example 3

Cream dyes were prepared as described in Example 1, but the compounds indicated in the following Table I are used as the isoxazolone (coupling) component and developer in substantially equimolar proportions. Under analogous conditions, the dye colors given in the right-hand column of the table were obtained at room temperature with a period of action of about 25 minutes.

The same results were obtained when the isoxazolones mentioned as the coupling component, provided this is not already the case in the given examples, contain attached to the nitrogen atom one of the following groups able to be hydrolytically split off: $C_2H_5CO—$, $CH_3CO—$, $C_6H_5CO—$, $C_6H_5NHCO—$, $CH_3OCO—$, $C_2H_5OCO—$, $C_6H_5SO_2—$.

of utilizing a coupling component compound having the formula

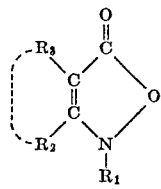

wherein $R_1$ is selected from the group consisting of hydrogen, lower alkanoyl, benzoyl, lower alkylbenzoyl, lower alkylcarbamoyl, phenylcarbamoyl, carbo-lower alkoxy, lower alkylsulfonyl and phenylsulfonyl; wherein $R_2$ is selected from the group consisting of lower alkyl, phenyl, and lower alkylphenyl; wherein $R_3$ is selected from the

TABLE I

| Example No.: | Isoxazolone coupler | Developer component | Color |
|---|---|---|---|
| 1 | 4-carboxy-β:γ-benzisoxazolone | p-aminophenol | Yellow brown. |
| 2 | do | 2,5-diaminotoluene | Dark red-brown. |
| 3 | do | 2-methyl-4-aminophenol | Yellow green. |
| 4 | do | α-naphthylamine | Yellow brown. |
| 5 | 3-phenyl-isoxazolone-5 | N-dimethyl-p-phenylenediamine | Dark brown. |
| 6 | do | N-diethyl-1,4-phenylenediamine | Brown. |
| 7 | do | 2,5-daiminotoluene | Red-brown. |
| 8 | do | 2-methyl-4-amino-phenol | Yellow. |
| 9 | do | p-amino-diphenylamine | Light brown. |
| 10 | do | α-naphthylamine | Yellow brown. |
| 11 | 1-acetyl-4-carboxy-β:γ-benzisoxazolone | do | Yellow. |
| 12 | β:γ-benzisoxazolone | N-dimethyl-p-phenylene-diamine | Black-brown. |
| 13 | do | N-diethyl-p-phenylene diamine | Red. |
| 14 | do | p-toluylenediamine | Dark red-brown. |
| 15 | do | p-amino-diphenylamine | Middle brown. |
| 16 | 2-acetyl-3-phenyl-isoxazolone-5 | N-diethyl-p-phenylene diamine | Red violet. |
| 17 | do | p-diaminoanisole | Violet brown. |
| 18 | 1-acetyl-6-carboxy-β:γ-benzisoxazolone | p-toluylenediamine | Dark brown. |
| 19 | 6-carboxy-β:γ-benzisoxazolone | do | Dark red brown. |
| 20 | do | N-diamethyl-1,4-phenylenediamine | Dark brown. |
| 21 | do | N-diethyl-1,4-phenylenediamine | Middle brown. |
| 22 | do | 2-methyl-4-aminophenol | Yellow brown. |
| 23 | do | p-amino-diphenylamine | Grey brown. |
| 24 | 1-acetyl-4(β-hydroxy-ethylamino)-carbonyl-β:γ-benzisoxazolone | N-diethyl-p-phenylenediamine | Yellow brown. |

In this example the various isoxazolones and developer components were employed in substantially equimolar amounts. However, other molar ratios such as 0.8 to 1.3 mols of the coupling component can be employed with comparable results.

When dyeing human hair, the hydrogen peroxide should preferably be added to the dye cream just prior to its application to the hair. The time required for dyeing the hair can be widely varied from the times indicated as side reactions causing color changes do not readily occur with the oxidation reaction of the isoxazolones and developer components.

The preceding specific embodiments are illustrative of the practice of the invention. It is to be understood however that other expedients known to those skilled in the art may be employed without departing from the spirit of the invention or the scope of the appended claims.

I claim:

1. In the process of dyeing human hair which comprises applying to the hair at a temperature of from 10° to 40° C. an effective amount of an aqueous composition for dyeing human hair comprising from 0.6% to 10% by weight of an oxidation dyestuffs combination of a developer component and a coupling component, having from 0.8 to 1.3 moles of coupling component for each mole of developer component in the presence of an oxidizing agent, the improvement which consists essentially group consisting of hydrogen and $R_2$; and, wherein $R_2$ and $R_3$ together, represent the residue of a six membered ring selected from the group consisting of tetramethylene, the remainder of a benzene ring, and the remainder of a substituted benzene whose substitutions are selected from the group consisting of lower alkyl, carboxyl, and carbamoyl.

2. The process of claim 1 wherein said coupling component compound has the formula

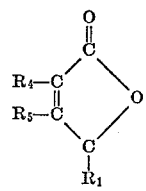

wherein $R_1$ is as defined in claim 1; $R_4$ is selected from the group consisting of hydrogen, alkyl having 1 to 4 carbon atoms and phenyl; and $R_5$ is selected from the group consisting of alkyl having 1 to 4 carbon atoms and phenyl.

3. The process of claim 1 wherein said coupling component compound is selected from the group consisting of compounds having the formulae

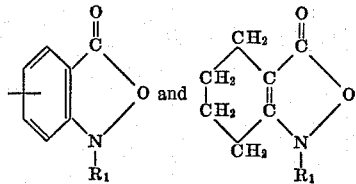

wherein $R_1$ is as defined in claim 1 and $R_7$ is selected from the group consisting of hydrogen, alkyl having 1 to 4 carbon atoms, carboxyl, and carbamoyl.

References Cited

UNITED STATES PATENTS 2,846,307   8/1958   Woolley _____ 96—56.4 X

ALBERT T. MEYERS, Primary Examiner
V. C. CLARKE, Assistant Examiner

U.S. Cl. X.R.
8—11

UNITED STATES PATENT OFFICE
CERTIFICATE OF CORRECTION

Patent No. 3,695,824　　　　　　　　　Dated October 3, 1972

Inventor(s) Rolf Rehberg

It is certified that error appears in the above-identified patent and that said Letters Patent are hereby corrected as shown below:

In the heading to the printed specification, between lines 7 and 8, insert -- Claims priority, application, Germany P 19 21 325.3, filed April 26, 1969. --.

Signed and sealed this 12th day of February 1974.

(SEAL)
Attest:

EDWARD M. FLETCHER, JR.　　　　　　C. MARSHALL DANN
Attesting Officer　　　　　　　　　　Commissioner of Patents